Dec. 2, 1952           M. L. LOVE           2,619,839
POWER-TRANSMITTING MECHANISM FOR CONVERTING
ROTATION TO RECIPROCATION
Filed July 17, 1950

INVENTOR.
Mahlon L. Love
BY
Attorneys

Patented Dec. 2, 1952

2,619,839

UNITED STATES PATENT OFFICE 2,619,839

POWER-TRANSMITTING MECHANISM FOR CONVERTING ROTATION TO RECIPROCATION

Mahlon L. Love, Geneseo, Ill., assignor to Deere & Company, Moline, Ill., a corporation of Illinois Application July 17, 1950, Serial No. 174,184

3 Claims. (Cl. 74—60)

This invention relates to power-transmitting mechanism and more particularly to mechanism of the character useful for converting or transmitting rotation to reciprocation. Primarily, the mechanism is developed for the driving of sickle bars such as used in mowers and like harvesters.

Considering the invention from the standpoint of its development for and use in a mower or like harvester, it must be recognized that various problems are presented in this field that are not present to such a great extent in other fields. For example, the reciprocating sickle of a mower is driven at relatively high speeds through relatively short strokes, which set up vibration of considerable magnitude. This vibration is transmitted through the mower cutter bar to both the driving members connected to the sickle and to the supporting or frame members connected to the cutter bar. In the case of a tractor-mounted mower, the vibration will of course reach the tractor.

Considerable effort has been expended in the past and many attempts made to eliminate or counteract the effect of the vibration of the character referred to above. Both of these expedients are represented by the use of rubber mountings and equivalent vibration-damping devices. Few, if any, of these are successful because they result merely in somewhat abortive attempts to isolate rather than to control the vibration. In other instances, designs have been developed in which counterweights have been utilized to balance or counteract the vibration of the sickle. The present invention utilizes the principle last mentioned and has for its principal object the provision of power-transmitting mechanism in which the driving means and counterweight means are considerably simplified over known constructions. Fundamentally, the drive mechanism developed according to the present invention utilizes a shaft having a pair of bent driving portions formed about converging axes inclined to the axis of rotation of the shaft, thus providing what is sometimes referred to as a wobble shaft. The bent or inclined drive portions serve as means to impart oscillation to a pair of driven members, one of which is connected to the sickle and the other of which carries a counterweight proportioned to counteract the forces of the sickle. Since the bent portions are inclined at the aforesaid converging axes, the angles through which the driven members will operate will be equal and the oscillation of one part will be opposite to that of the other part so that as the sickle driving member moves in one direction the member that carries the counterweight will move in the opposite direction. The utilization of the type of shaft referred to enables the incorporation of the drive mechanism in a simplified and compact assembly. A further feature of the invention is the provision in the drive mechanism of means whereby the mechanism may be readily adapted to mowers of existing types. A still further object of the invention is to utilize the driven members as means for journaling the rotatable input shaft, so that additional bearings for the shaft will not be needed.

The foregoing and other important objects and desirable features inherent in and encompassed by the invention will become apparent as a preferred embodiment of the invention is disclosed in detail in the following description and accompanying sheet of drawings in which Figure 1 is a plan view of the rear portion of a tractor-mounted mower equipped with the drive mechanism;

It will be understood, of course, that the present disclosure is based on a typical adaptation of the drive mechanism to a mower of the type mounted directly on a tractor. Other types of mowers could be similarly equipped with drive mechanism constructed according to the principles of the present invention. Further, throughout the specification and claims, reference will be had to certain parts as having upper and lower portions and front and rear ends, etc. These terms are used merely for the purpose of brevity and clarity and not as limiting the invention to the precise details disclosed.

Figure 1:
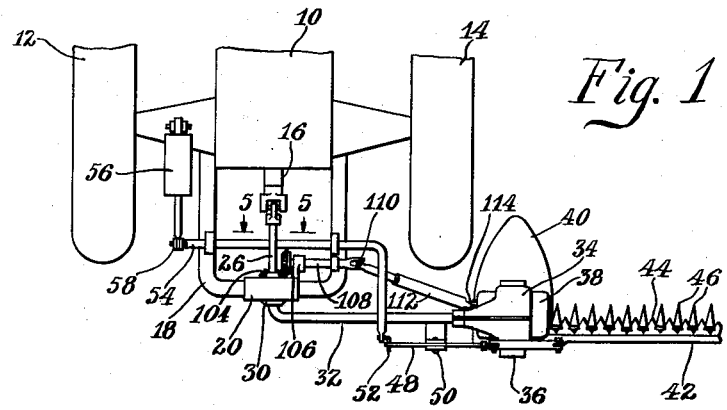
Figure 2:
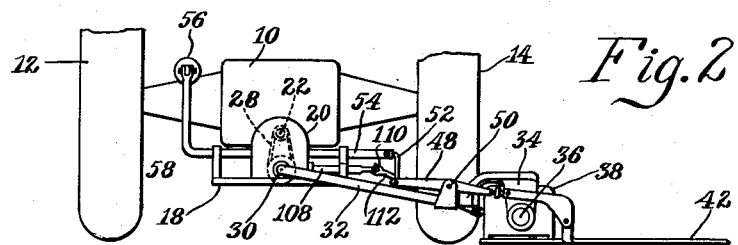
Figure 2 is a fragmentary rear view of the tractor mower of Figure 1.
Figure 5:
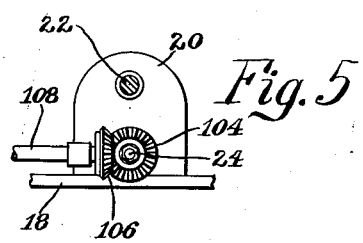
Figure 5 is a sectional view taken on the line 5—5 of Figure 1 and showing part of the power line from the tractor to the mower-driving shaft.

The tractor shown in Figures 1 and 2 may be of any conventional construction, including a longitudinal body 10 carried on rear traction wheels 12 and 14 and having a rearwardly projecting power take-off shaft 16. A drawbar 18 at the rear of the tractor provides a suitable support for a housing 20 within which are journaled an upper shaft 22 and a lower shaft 24. The upper shaft is connected by telescopic shafting 26 to the power take-off shaft 16. The lower shaft is driven from the upper shaft by belt and sheaves means as suggested at 28 in Figure 2.

The lower portion of the housing 20 provides a bearing at 30 in which is pivotally carried the inner end of a transversely extending support or drag bar 32 having at its outer end a yoke 34. This yoke is pivotally connected on a longitudinal horizontal axis at 36 to a support or housing 38. This support or housing is mounted on a conventional mower inner shoe 40 and a cutter or sickle bar 42 extends transversely therefrom. A sickle or knife 44 is carried by the cutter bar 42 for reciprocation to cooperate with conventional mower guards 46 in the usual manner.

The cutter bar 42 and support or housing 38 may be tilted about the axis at 36 by linkage 48 pivoted at 50 on the drag bar 32 and connected by a link 52 to the rearwardly extending arm of a transverse rockshaft 54 journaled on the drawbar 18. Power for effecting tilting of the cutter bar as aforesaid may be derived from a fluid motor such as that shown at 56, which is connected to an upstanding arm 58 on the rockshaft 54. These details may be varied according to the type of mower utilized and are set forth here merely for the purposes of background disclosure.

Figure 3:
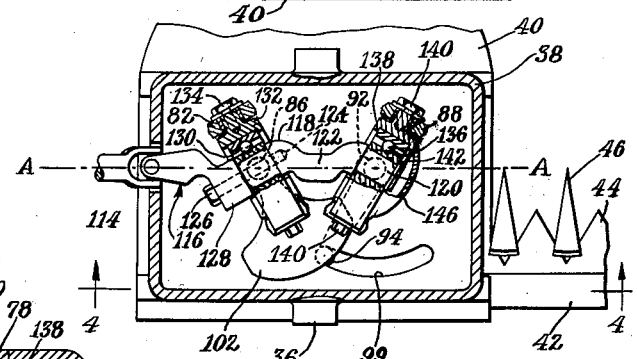
Figure 3 is an enlarged sectional view of the drive mechanism and support or housing, the section being taken in offset horizontal planes to better illustrate the construction involved.
Figure 4:
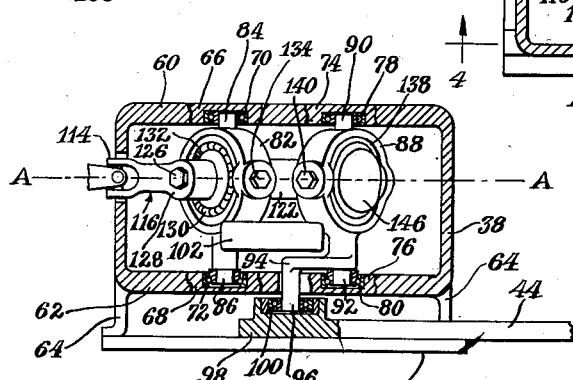
Figure 4 is a sectional view taken substantially on the line 4—4 of Figure 3, the section in this view, however, departing somewhat from the section line to illustrate the trunnions for the driven members.

As best shown in Figures 3 and 4, the support or housing 38 has upper and lower walls 60 and 62, the lower wall being spaced above the inner shoe 40, as by means of a pair of legs 64 which serve to rigidly mount the housing on the shoe. The upper and lower walls 60 and 62 are provided respectively with carrier or bearing portions 66 and 68 within which are respectively received anti-friction bearings 70 and 72, which bearings are coaxial on a vertical axis. The upper and lower walls are further provided respectively with a second pair of carrier or bearing portions 74 and 76 within which are respectively received anti-friction bearings 78 and 80. The second pair of bearings are coaxial on a vertical axis parallel to and spaced transversely from the axis of the bearings 70—72.

The first pair of bearings 70 and 72 provide means for the mounting of a driven member in the form of a ring 82 having trunnions 84 and 86 coaxial on a diameter of the ring. The ring is thus carried for oscillation about the axis of the trunnions 84—86. A second ring 88 provides a second driven member having trunnions 90 and 92 coaxial on a vertical diameter thereof and journaled for oscillation in the bearings 78—80. The lower portion of the ring 88 has fixed or otherwise suitably connected thereto a power-receiving member in the form of a power-output arm 94, an integral terminal portion 96 of which extends downwardly through an arcuate slot 99 in the bottom wall 62 of the casing or support 38. The inner end of the sickle or knife 44 is in the form of a knife head 98 provided with an anti-friction bearing 100 which receives the arm portion 96. Oscillation of the ring 88 about its trunnion axis through 90—92 will, of course, reciprocate the sickle 44, the connection at 96—100—98 including a sliding connection (not shown) to compensate for the arcuate travel of the arm 94 as respects the straight-line travel of the knife 44. This is a relatively unimportant detail and any other suitable provision could be made.

The lower portion of the other ring 82 has fixed or otherwise suitably connected thereto a power-receiving member in the form of a counterweight 102, which is proportioned to counterbalance the forces set up by the reciprocating sickle 44. Further details of this relationship will be brought out below.

The lower shaft 24 in the housing 20 carried on the tractor drawbar has keyed to the forward end thereof a bevel pinion 104 in constant mesh with a bevel pinion 106 keyed to a transverse shaft 108 journaled on the drawbar 18 and having at its outer or right-hand end a universal joint connection 110 with a telescopic shaft 112. The shaft 112 extends transversely toward the housing 38 and has a universal joint connection 114 with a rotatable power input shaft 116. The shaft 116 is journaled in the support independently of any direct bearing connection with the support, as will be brought out below. The axis of rotation of the shaft 116 is designated A—A in Figures 3 and 4.

The input shaft 116 passes through or is encircled by the rings 82 and 88. This shaft has a first cylindrical or bearing portion 118 and a second cylindrical or bearing portion 120. The two portions 118 and 120 are axially spaced on the shaft 116 and are joined by an intermediate portion 122 on the axis of the shaft. For all practical purposes, the shaft 116 may be considered as being made up of one piece in which the portions 118 and 120 are displaced or bent at the angles indicated. The portions 118 and 120 are cylindrical and formed respectively about axes inclined to the axis A—A so that these axes converge to a point outside the axis A—A. Stated otherwise, the axes of the portions 118 and 120 are oppositely inclined at equal angles to the axis A—A.

For the purposes of manufacture and assembly, the shaft 116 is preferably not made of one piece, but the cylindrical portion 118 is drilled and tapped at 124 to receive a relatively long cap screw 126 by means of which a shaft end portion 128 is secured to the remainder of the shaft. The end portion 128 includes a portion of the universal joint at 114.

As shown, the parts are assembled with the axes of the cylindrical portions 118 and 120 respectively concentric with the axes of the rings 82 and 88. The axes of the cylindrical portions 118 and 120 intersect the axis A—A respectively at the points of intersection of the axis A—A with the vertical axes through the trunnions 84—86 and 90—92. The general planes of the rings 82 and 88 thus converge and the lever arms involved in the power-receiving arm 94 and counterweights 102 likewise converge. Inasmuch as the rings 82 and 88 are constrained against rotation about the axes of the portions 118 and 120, movement thereof is confined to oscillation about the respective trunnion axes. Power-transmitting connections are provided between the portions 118 and 120 and the rings 82 and 88. The connection for the ring 82 includes an annular anti-friction bearing 130 concentric with and mounted on the portion 118 and contained within an annular carrier 132 journaled and retained within the ring 82 by a pair of coaxial trunnions including set screws 134. The other driving connection is effected by an anti-friction bearing 136 concentric with and mounted on the other portion 120 and contained within an annular carrier 138 journaled and retained in the ring 88 by a pair of coaxial trunnions including set screws 140. Thus, as the shaft 116 rotates about its axis A—A, the angularly related portions 118 and 120 will rotate about the same axis; but, being inclined as they are, will impart a wobble or oscillatory motion to the rings 82 and 88, power being transmitted through the bearings 130. This will result in opposite oscillation of the power-receiving members 94 and 102. Therefore, as the sickle is driven outwardly to the right, the counterweight 102 will move in the opposite direction, or to the left. Similarly, as the sickle moves inwardly to the position shown in Figure 3, the counterweight 102 will also move inwardly.

The bearing 130 is retained in place on the cylindrical portion 118 by means of the end portion 128 of the shaft 116. The other bearing 136 is retained on the cylindrical portion 120 by a snap ring 142. A cap 144 may be utilized to enclose the end of the assembly included in the ring 88.

Various features of the invention not specifically enumerated herein will undoubtedly occur to those versed in the art, as will numerous modifications and alterations in the preferred embodiment of the invention illustrated, all of which may be achieved without departing from the spirit and scope of the invention as defined in the appended claims.

What is claimed is:

1. Power transmitting mechanism, comprising: a support; a pair of carrier elements fixed to the support in spaced apart relation and providing a pair of parallel trunnion axes; first and second driven members having trunnions carried respectively by the carrier elements for oscillation respectively about said trunnion axes; means constraining the driven members against shifting axially of said trunnion axes; an input shaft positioned adjacent the support with its principal axis normal to and intersecting the trunnion axes, said shaft having fixed thereto first and second shaft portions on axes inclined to the principal axis of the shaft and intersecting said principal axis respectively at the intersections of said principal axis by the trunnion axes; the driven members having open center portions respectively embracing the shaft portions; and first and second bearing means respectively journaling the first and second shaft portions in the open center portions of the driven members and constraining each shaft portion and its driven member against relative movement along the axis of the shaft portion and along the associated trunnion axis, said bearing means constituting the sole means for journaling the shaft on the support for rotation about its principal axis to effect oscillation of the driven members respectively about the trunnion axes.

2. Power transmitting mechanism, comprising: a support having upper and lower, spaced apart, relatively fixed carrier parts; an input shaft rotatable about its principal axis and disposed with said axis horizontal and intermediate the carrier parts, said shaft having first and second shaft portions spaced axially thereon and inclined to the shaft axis so that the axes of the shaft portions intersect the shaft axis at points spaced along the shaft axis; first and second driven rings respectively concentric with the shaft portions; bearing means journaling each ring on its shaft portion and constraining the ring and its shaft portion against relative movement along the axis of the shaft portion; and first and second trunnion means connecting the rings to the support for oscillation respectively about upright parallel axes passing respectively diametrically through the rings and respectively through the aforesaid spaced points, each of said trunnion means including upper and lower trunnions coaxial on the respective axis of oscillation and mounted respectively on the upper and lower carrier parts of the support; said bearing means and trunnion means constituting the sole means for journaling the shaft on the support for rotation about its principal axis to effect oscillation of the driven rings.

3. Power transmitting mechanism comprising: a support; an input shaft positioned adjacent the support for rotation about its principal axis and having first and second shaft portions inclined to the shaft axis at opposite but equal angles so that the axes of the shaft portions intersect the shaft axis at points spaced apart on said shaft axis; first and second trunnion means spaced apart on the support respectively on parallel axes normal to the shaft axis and intersecting said shaft axis at said spaced points; first and second driven members carried respectively by the trunnion means for oscillation respectively about said trunnion axes, the driven members having open center portions respectively embracing the shaft portions; first and second bearing means respectively concentric with the first and second shaft portions and journally interconnecting the shaft portions respectively with the driven members, each bearing means being constructed to constrain its driven member against movement relative to its shaft portion along the axis of said shaft portion, whereby rotation of the input shaft about its axis causes oscillation of the driven members simultaneously but in opposite directions about the trunnion axes; a work member drivingly connected to one driven member for movement with said one driven member according to its directions of oscillation; and a counterweight drivingly connected to the other driven member for movement with said other driven member according to its directions of oscillation.

MAHLON L. LOVE.

REFERENCES CITED

The following references are of record in the file of this patent:

UNITED STATES PATENTS

| Number | Name | Date |
|---|---|---|
| 1,390,890 | Dyer | Sept. 13, 1921 |
| 2,138,862 | Johnston | Dec. 6, 1938 |
| 2,263,561 | Biermann | Nov. 25, 1941 |
| 2,428,924 | Albertson | Oct. 14, 1947 |
| 2,505,978 | Long | May 2, 1950 |